United States Patent
Romesburg et al.

(10) Patent No.: US 6,622,030 B1
(45) Date of Patent: Sep. 16, 2003

(54) ECHO SUPPRESSION USING ADAPTIVE GAIN BASED ON RESIDUAL ECHO ENERGY

(75) Inventors: Eric Douglas Romesburg, Chapel Hill, NC (US); Manuel Rosendo Arana-Manzano, Durham, NC (US)

(73) Assignee: Ericsson Inc., Research Triangle Park, NC (US)

( * ) Notice: Subject to any disclaimer, the term of this patent is extended or adjusted under 35 U.S.C. 154(b) by 505 days.

(21) Appl. No.: 09/607,190

(22) Filed: Jun. 29, 2000

(51) Int. Cl.[7] ............................. H04B 3/20; H04M 1/00
(52) U.S. Cl. ................. 455/570; 455/63.1; 455/67.13; 379/406.01; 379/406.04; 379/406.05; 379/406.08
(58) Field of Search ............................. 455/570, 501, 455/63, 67.3, 67.4, 67.13; 379/406.01, 406.04

(56) References Cited

U.S. PATENT DOCUMENTS

| | | | | | |
|---|---|---|---|---|---|
| 4,852,161 | A | * | 7/1989 | Hagiwara | 379/410 |
| 5,283,784 | A | * | 2/1994 | Genter | 370/32.1 |
| 5,475,731 | A | * | 12/1995 | Rasmusson | 379/3 |
| 5,668,794 | A | * | 9/1997 | McCaslin | 370/288 |
| 5,825,753 | A | * | 10/1998 | Betts | 370/289 |
| 5,978,473 | A |  | 11/1999 | Rasmusson | |
| 6,160,886 | A | * | 12/2000 | Romesburg | 379/410 |
| 6,178,162 | B1 | * | 1/2001 | Dal Farra | 370/286 |
| 6,532,289 | B1 | * | 3/2003 | Magid | 379/406.01 |

FOREIGN PATENT DOCUMENTS

| | | |
|---|---|---|
| EP | 0895397 A2 | 3/1999 |
| GB | 2245459 A | 2/1992 |

* cited by examiner

Primary Examiner—William Trost
Assistant Examiner—Brandon J Miller
(74) Attorney, Agent, or Firm—Coats & Bennett, PLLC (57) ABSTRACT

An echo suppressor for bi-directional communications includes an echo canceler and a residual echo suppressor having variable gain. The gain of the residual echo suppressor is controlled based on a characteristic, such as the estimated energy, of the residual voice echo, or alternatively the entire residual echo, preferably on a per-frame basis. In some embodiments, the residual voice echo energy is compared against the estimated non-echo energy to determine the required amount of gain to apply so as to attenuate the residual voice echo below a psychoacoustic perception level. In some optional embodiments, comfort noise is added to the output signal after the residual echo suppressor in an amount that corresponds to the amount of signal energy loss through the residual echo suppressor. Thus, in some embodiments, desired voice and background noise (including local background noise and comfort noise) are used to mask the presence of residual echo. This approach avoids the problematic differentiation between echo single-talk and double-talk (desired voice) situations, thereby obviating the need for a desired voice detector.

38 Claims, 4 Drawing Sheets

FIG. 4

ECHO SUPPRESSION USING ADAPTIVE GAIN BASED ON RESIDUAL ECHO ENERGY

BACKGROUND OF THE INVENTION

The present invention relates to the field of echo suppression during bi-directional communications, and more particularly to a method of variable gain echo suppression where the gain varies based on a characteristic of the residual echo after initial echo cancellation.

Several approaches have been proposed that attempt to regulate echo during bi-directional communications, particularly bi-directional communication using wireless communications devices, such as mobile terminals, which may be subject to rapidly changing acoustic environments. Typically, prior methods selectively engage an echo suppressor depending on a variety of conditions, such as when an incoming signal includes echo-causing voice. For instance, when the incoming signal does not include echo-causing voice, the echo suppressor is bypassed, or the gain of the echo suppressor may be set to one. On the other hand, when the incoming signal includes echo-causing voice (or echo-causing voice and noise), further analysis is employed to determine whether there is single-talk or double-talk. Single-talk arises when the echo-causing voice is present, but not desired voice (e.g., only the remote user is talking in the context of acoustic echo suppression); in this situation, the gain of the echo suppressor is set low so as to significantly attenuate the otherwise present echo in the outgoing signal. Double-talk arises when both echo-causing voice and desired voice are present (e.g., both the local user and the remote user are talking simultaneously); in this situation, the gain of the echo suppressor is set to an intermediate level to attenuate the potential echo signal, but not eliminate the desired voice from the outgoing signal. Thus, the echo suppressor is controlled differently depending on whether echo-causing voice, desired voice, or both are present. One difficulty in such approaches is in having the communications devices quickly and accurately determine which condition applies at any given moment in time. Stated rather simplistically, it is very difficult for communications devices to determine who is doing the talking—the local user, the remote user(s), or both—at any given time and to rapidly and accurately switch between the corresponding modes, especially in the presence of rapidly changing background noise and/or a rapidly changing echo path. Typically, this mode selection task involves a so-called desired-voice detector, which is necessarily complex.

SUMMARY OF THE INVENTION

The present invention obviates the need to differentiate between echo single-talk and double-talk (desired voice) situations, thereby obviating the need for a desired-voice detector. The approach of the present invention focuses on controlling the gain of the residual echo suppressor based on the estimated energy of the residual voice echo, or alternatively the entire residual echo, preferably on a per-frame basis. In some embodiments, this residual voice echo energy is compared against the estimated non-echo energy to determine the required amount of gain to apply so as to attenuate the residual voice echo below a psychoacoustic perception level. In some optional embodiments, comfort noise is added to the output signal from the residual echo suppressor in an amount that corresponds to the amount of signal energy loss through the residual echo suppressor. Thus, in some embodiments, desired voice and background noise (including local background noise and comfort noise) are used to mask the presence of residual echo.

DETAILED DESCRIPTION OF THE PREFERRED EMBODIMENT(S)

Figure 1:
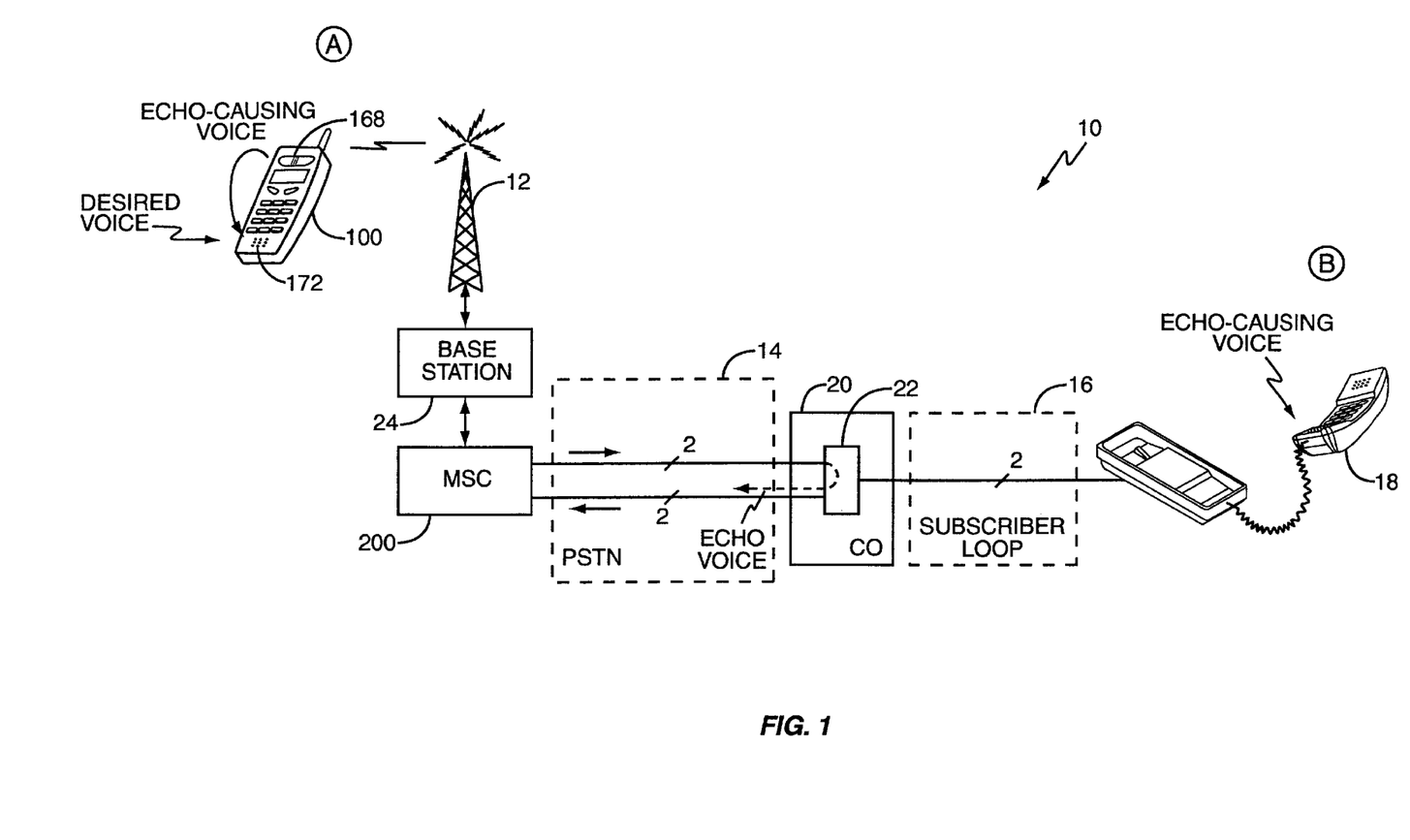
FIG. 1 shows a general overview of a communications system in which the present invention may be used.

FIG. 1 illustrates an exemplary bi-directional communications system 10 in which the echo suppression techniques of the present invention may be advantageously used. Viewed as a composite, the communications system 10 includes a mobile terminal 100 in wireless communications with a Mobile Switching Center 200 (MSC) via communications tower 12 and associated base station 24. MSC 200 interfaces to Central Office (CO) 20 via a transmission network 14, such as the Public Switched Telephone Network (PSTN). Voice input into the microphone 172 of mobile terminal 100 at end A is encoded by the mobile terminal 100 and transmitted to the MSC 200 via tower 12 and associated base station 24, where it is further processed and then transmitted to Central Office 20 through transmission network 14. Central Office 20 transmits these signals to a conventional telephone handset 18 via a two-wire subscriber loop 16. The telephone handset 18 outputs a facsimile of the mobile terminal user's voice based on these received signals. Conversely, voice input from a telephone handset user is converted into transmit signals that are conveyed from the telephone handset 18 at end B to the Central Office 20 via subscriber loop 16. The signals are then conveyed to MSC 200 via transmission network 14, where they are encoded for transmission to mobile terminal 100 via tower 12. Mobile terminal 100 receives and decodes these transmitted signals. After decoding, these received signals are used by the mobile terminal 100 to drive included loudspeaker 168, thereby generating a facsimile of the telephone handset user's voice.

The foregoing arrangement is susceptible to two primary sources of echo. First, voice signals from the telephone handset user, as reproduced by the loudspeaker 168 in mobile terminal 100, undesirably couple back into the microphone 172 of mobile terminal 100. Thus, the telephone handset user receives signals representative of the mobile terminal user's voice ("desired voice") as well as an echo signal representative of their own transmitted voice ("echo voice" or "voice echo"), a phenomenon referred to as acoustic echo. Because of round-trip transit delay in the communications system 10, the echo signal may be significantly displaced in time from their actual voice signal. As newer mobile terminals 100 become increasingly smaller, physical separation of the included loudspeaker 168 and microphone 172 is diminished, thereby increasing acoustic coupling problems. In an exemplary embodiment, mobile terminal 100 includes the improved echo suppression of the present invention to minimize acoustic echo returned to the telephone handset user.

A second cause of echo, referred to as network echo, can result from impedance mismatches between a 4-to-2 wire hybrid circuit 22 and the 2-wire subscriber loop 16. Thus, network echo may result from interfacing the four-wire transmission network 14 with the two-wire subscriber loop 16. Telephone handset 18 both transmits and receives signals using the two-wire subscriber loop 16. Within Central Office 20, the hybrid circuit 22 separates these combined transmit and receive signals for interface with the separate transmit and receive circuits comprising the transmission network 14. Because of imperfect impedance matching, a portion of transmit signal energy transmitted on the two-wire transmit pair of transmission network 14 undesirably reflects back to MSC 200 on the two-wire receive pair of transmission network 14. Thus, signals received through transmission network 14 by MSC 200 include not only signals from the telephone handset 18, but also include signals transmitted by MSC 200. Consequently, the mobile terminal user receives signals representative of the telephone handset user's voice (desired voice), as well as an echo signal representative of their own transmitted voice (echo voice). Because of encoding and transmission delays, this received echo voice may be significantly displaced in time from their actual voice signal. In a second exemplary embodiment, the MSC 200 incorporates the improved echo suppression of the present invention to minimize network echo returned to the mobile terminal user.

For completeness, FIG. 1 shows both acoustic echo and network echo. It should be noted that the labels "echo-causing voice" and "desired voice" near A and B are for reference in discussing acoustic echo while the label "echo voice" in transmission network 14 is for reference in discussing network echo. Also, note that while FIG. 1 depicts a communications system 10 in which a mobile terminal 100 communicates with a telephone handset 18, such illustration is for benefit of understanding the discussion herein and should not be construed as limiting the application of the present invention. Echo suppression, as practiced in accordance with exemplary embodiments of the present invention, may involve both network and acoustic echo suppression in or between various kinds or types of communication applications. Examples of such applications include mobile terminal-to-mobile terminal communications, speaker-phone communications, and various other voice or data systems. Thus, various embodiments of the present invention may be advantageously used to control echo in a broad range of bi-directional voice and data communication applications.

Figure 2:
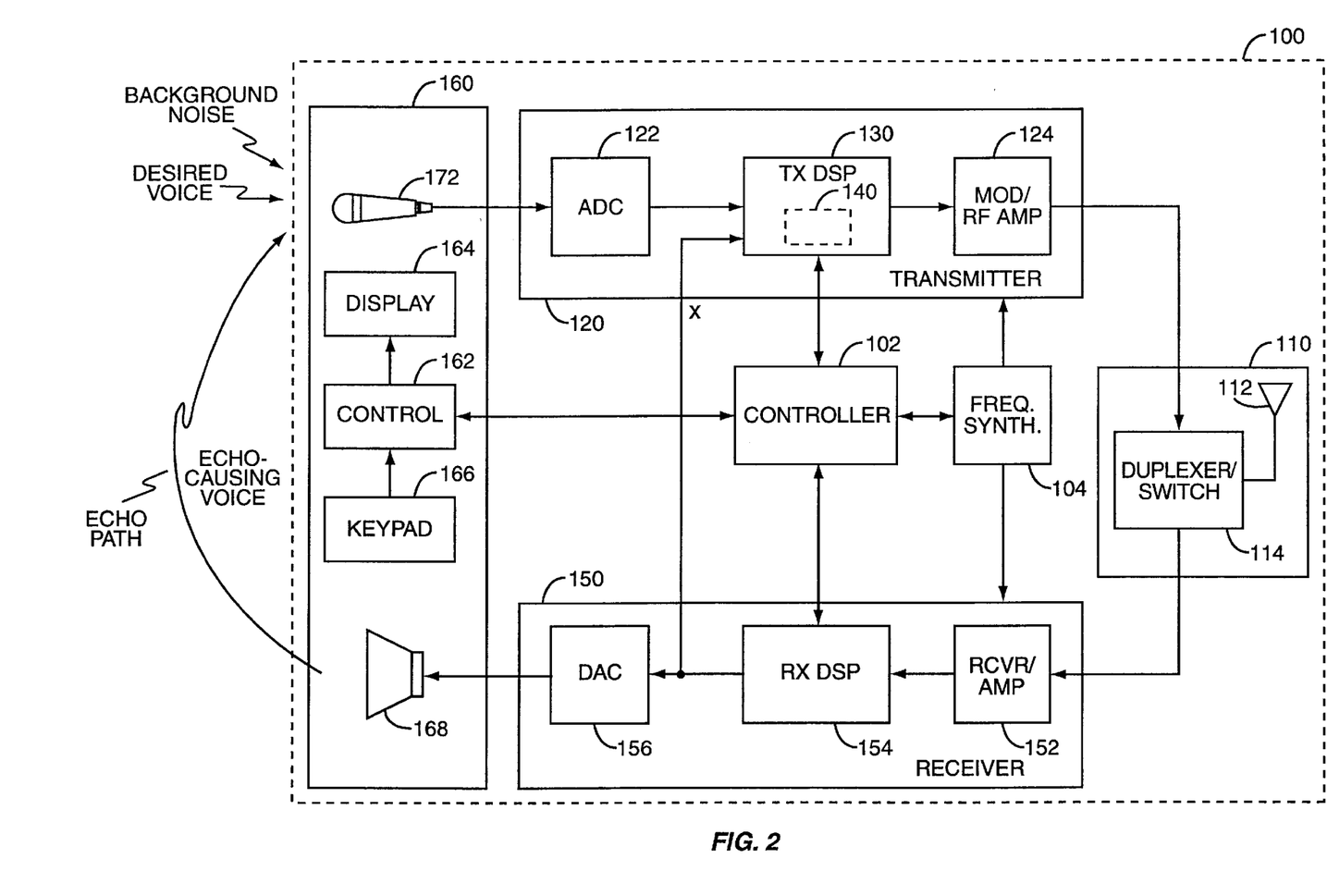
FIG. 2 shows the details of one exemplary wireless communications mobile terminal incorporating the echo suppressor of the present invention.

A functional overview of mobile terminal 100 may facilitate understanding the present invention; as such, FIG. 2 shows one embodiment of a wireless communications mobile terminal 100 that employs the present invention. While FIG. 2 illustrates one exemplary mobile terminal 100, the present invention may be practiced in a wide variety of communications device architectures. Thus, the present invention is not limited to only the embodiment of FIG. 2 and the design and implementation details of FIG. 2 not directly associated with the present invention are not critical and should not be considered limiting.

Referring to FIG. 2, mobile terminal 100 includes an operator interface 160, a controller 102, a frequency synthesizer 104, a transmitter 120, a receiver 150, and an antenna assembly 110. Operator interface 160 typically includes a display 164, a keypad 166, a microphone 172 or other suitable audio transducer, a loudspeaker 168 or other suitable audio transducer, and an interface controller 162. The display 164 allows an operator to dial digits, monitor call status, and view other service information. Keypad 166 allows the operator to dial numbers, enter commands, and select various options. The interface controller 162 interfaces the display 164 and keypad 166 with the controller 102. Microphone 172 receives acoustic signals and converts them to an audio input signal. Loudspeaker 168 converts an audio output signal produced by the receiver 150 into an audible signal representative of sounds (voice and noise) from the remote communications device 20. The audio input signal includes signal components representative of the mobile terminal user's voice (desired voice), the local background noise (ambient noise), and an echo component resulting from the remote audio reproduction output by loudspeaker 168.

The audio input signal from microphone 172 is supplied to transmitter 120, where it is processed to form a transmit signal which is transmitted to communications tower 12, via antenna assembly 110. The transmitter 120 includes an analog-to-digital converter (ADC) 122, a digital signal processor (DSP) 130, and a modulator/RF amplifier 124. The ADC 122 converts the audio input signal from an analog form to a digital form, with the digital form essentially comprising an array of digital values corresponding to the analog signal. An amplifier (not shown) disposed before ADC 122 may buffer and/or amplify the analog audio input signal before conversion by ADC 122.

Transmitter DSP 130 receives the digital audio input signal from ADC 122. In cooperation with controller 102, transmitter DSP 130 processes the digital audio input signal for transmission by modulator/RF amplifier 124. Modulator/RF amplifier 124 transmits at a carrier frequency derived from a signal output by frequency synthesizer 104, with the specific carrier frequency based on current communication channel assignments. Transmitter DSP 130 typically includes a speech coder and channel coder (not shown) for processing the digitized audio input signal to prepare it for transmission. The speech coder compresses the digital signal and the channel coder inserts error detection, error correction, and signaling information in accordance with requirements of the communications system 10 in which the mobile terminal 100 is used. In an exemplary embodiment, transmitter DSP 130 functionally incorporates a echo suppressor 140 using the residual echo based approach to gain control of the present invention, as will be more fully detailed below. Thus, in an exemplary embodiment of the present invention, transmitter DSP 130 operates on the audio input signal (in either analog or digital format) to adjust the transmit signal gain based on estimating the residual echo energy. The modulator/RF amplifier 124 converts the output from transmitter DSP 130 into a signal suitable for transmission by antenna assembly 110.

Antenna assembly 110 may include a duplexer/switch 114 and antenna 112 for receiving and transmitting wireless signals in a manner well known in the art.

Receiver 150 includes a receiver/amplifier 152, a receiver DSP 154, and a digital-to-analog converter (DAC) 156. Signals received through the antenna assembly 110 are passed to the receiver/amplifier 152, which shifts the frequency spectrum of the received RF signals and amplifies them to a level appropriate for subsequent processing by the receiver DSP 154. Frequency synthesizer 104 typically provides receiver/amplifier 152 with an injection signal having a frequency related to current communications channel assignments for downconverting the received RF signals. Receiver DSP 154 usually includes an equalizer to compensate for phase and amplitude distortions in the channel-corrupted signal, a demodulator for extracting bit sequences from the received signal, and a detector for determining transmitted bits based on the extracted sequences (not shown). A channel decoder checks for channel errors in the received signal. The channel decoder includes logic for separating control and signaling data from speech data (not shown). Control and signaling data passes to the controller 102 while speech data passes to a speech decoder (not shown) for processing.

Speech decoding produces an audio output signal, which is converted from digital format to analog format by DAC 156. The analog audio output signal drives loudspeaker 168 to produce an audible output (e.g., voice) from the remote user. An audio output amplifier may be disposed between the analog output of DAC 156 and loudspeaker 168 for buffering and/or amplifying the analog audio output signal before it is input to loudspeaker 168.

The controller 102 coordinates the operation of the transmitter 120 and the receiver 150, and may, for instance, take the form of a typical microprocessor. This microprocessor may be a dedicated or shared microprocessor, a single processor or multiple, parallel processors, as needed or desired. Coordination of the receiver 150 and transmitter 120 includes coordinating power control, channel selection, and timing, as well as a host of other functions known in the art. In some embodiments of the present invention, the controller 102 may participate in adjusting one or both transmit and receive signal gains. The controller 102 inserts signaling messages into the transmitted signals and extracts signaling messages from the received signals. The controller 102 responds to commands contained in the extracted signaling messages, including communications channel reassignments, and implements user commands. When the user enters commands via the keypad 166, interface controller 162 transfers them to the controller 102 for action.

Figure 3:
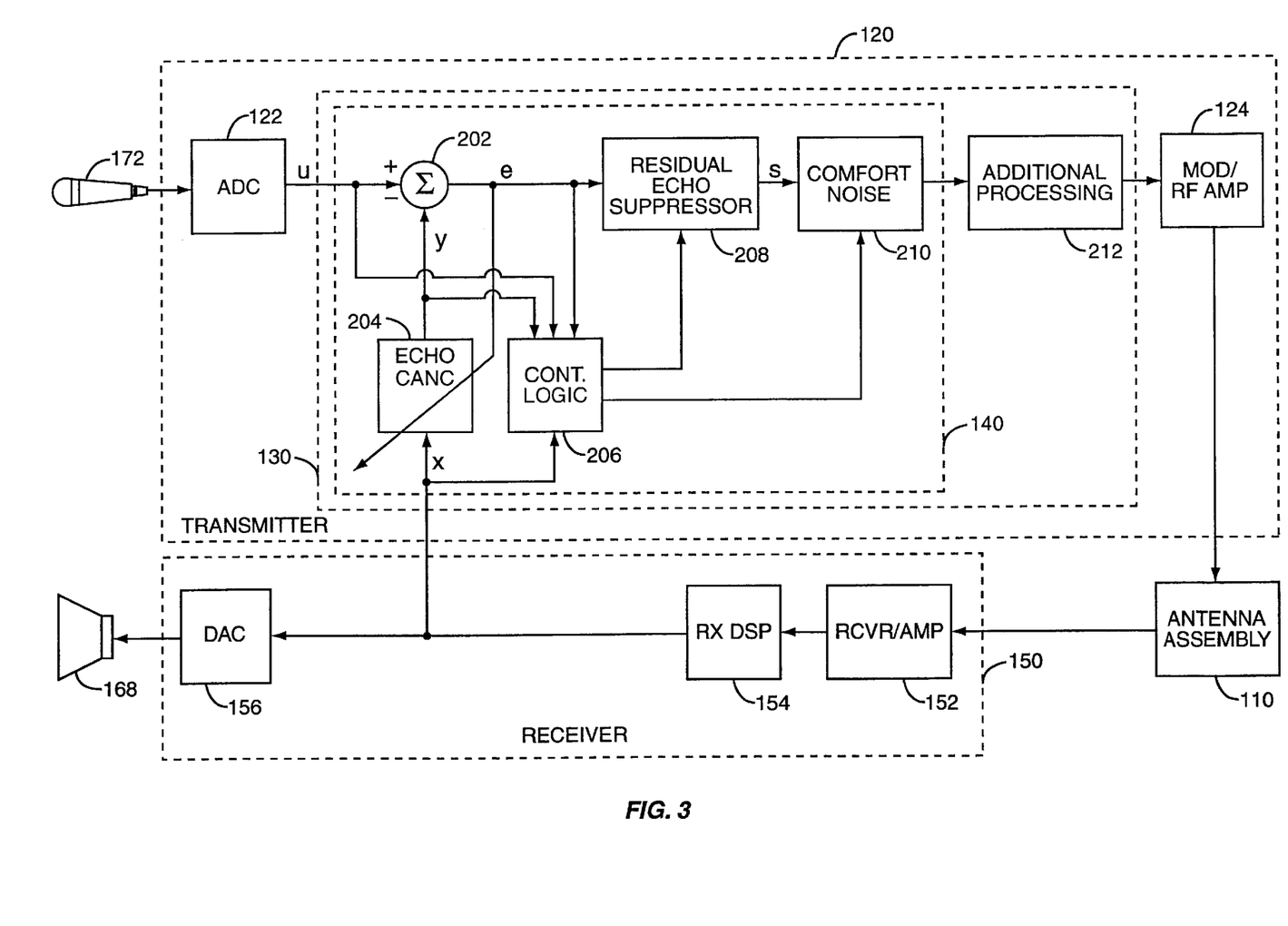
FIG. 3 shows one embodiment of a transmit signal path for the mobile terminal of FIG. 2 in greater detail.

Referring to FIG. 3, transmitter DSP 130 includes an echo suppressor 140 and an additional processing block 212. The echo suppressor 140 typically includes a summing circuit 202, an echo canceler 204, control logic 206, a residual echo suppressor 208, and a comfort noise unit 210. ADC 122 digitizes the analog audio input signal from microphone 172, forming the audio input signal u. The audible signal output from loudspeaker 168 undesirably couples into the audio input signal as an echo signal via microphone 172. Thus, audio input signal u may be thought of as an echo-containing signal which, in this example typically contains desired voice, local background noise, and an echo signal. Echo canceler 204, which is typically a linear echo canceler (LEC), functions as an adaptive filter to produce an estimate of this echo signal, called the estimated-echo signal y, based on processing the audio output signal x. As noted, receiver DSP 154 of this example generates this audio output signal x based on decoding received wireless signals.

Summing circuit 202 operates to remove the estimated-echo signal y from audio input signal u by combining the audio input signal u with the estimated-echo signal y, and outputs an echo-canceled signal e. The echo-canceled signal e may be thought of as containing four components—desired voice, background noise, residual voice echo, and residual noise echo. For ease of reference, the combination of the residual voice echo and the residual noise echo is simply called residual echo. The echo-canceled signal e feeds back to LEC 204, where it is used to adapt the digital filter coefficients of LEC 204 so that the estimated-echo signal y tracks actual echo conditions. In general, the process of removing (or "canceling") an echo component from the echo-containing signal u may be considered to include the LEC 204 operating in combination with summing circuit 202. Applicant's co-pending U.S. application Ser. No. 09/005,144, entitled "Methods and Apparatus for Controlling Echo Suppression in Communications Systems," filed on Jan. 9, 1998, provides information related to the operation of LEC 204, and is incorporated herein by reference. As an alternative to LEC 204, an echo canceler adapted to compensate for non-linear loudspeaker behavior can be used, as described in U.S. Pat. Nos. 5,680,450 and 5,600,718 to Dent, both of which are incorporated herein by reference.

Echo-canceled signal e is passed to residual echo suppressor 208, which applies a gain to signal e, under the direction of a control signal provided by control logic 206, to produce an echo suppressed signal s. This echo suppressed signal s from residual echo suppressor 208 is passed to the optional comfort noise unit 210 which may add comfort noise to signal s to produce an augmented signal or may simply pass signal s along unaltered. Optionally, the amount of comfort noise added may depend on the gain of residual echo suppressor 208. For information related to the generation and insertion of comfort noise, see U.S. application Ser. No. 09/005,145, entitled "Methods and Apparatus for Providing Comfort Noise in Communications Systems," filed on Jan. 9, 1998, which is incorporated. herein by reference. It should be noted that in some instances, the gain of residual echo suppressor 208 may be one, meaning that comfort noise of zero is added by comfort noise unit 210. This augmented echo suppressed signal is then further processed in additional processing block 212, which comprises, among other things, the speech and channel encoder operations discussed earlier. Transmitter DSP 130 provides this processed signal to modulator/RF amplifier 124, where it is used to form a transmit signal. The transmit signal is routed to antenna assembly 110 for transmission.

Control logic 206 operates to control the gain of residual echo suppressor 208 based on a characteristic of the residual echo component in echo-canceled signal e. For simplicity, the following discussion will assume that the control logic 206 focuses on residual echo (the combination of residual voice echo and residual noise echo), rather than only residual voice echo alone. However, the present approach may also be applied with the control logic 206 focusing on residual voice echo, as described further below.

In most embodiments, control logic 206 estimates the energy of the residual echo component and then determines an appropriate gain for the residual echo suppressor 208 based thereon. In one approach, the residual echo suppressor 208 may measure the energy of the residual echo component using a correlation-based approach that compares the correlation of x to u against the correlation of x to e. By way of example, assume that the incoming audio signal u may be divided into frames having length M, and each frame may be further divided into sample intervals. For reference, frames are twenty milliseconds and each frame is typically divided into 160 sample intervals (i.e., M =160) for TIA/EIA-136 systems. Assuming that element zero (e.g., i=0 in the following) represents the newest sample, the correlation of signal x to signal u ($Corr_{x-u}$) for each interval k may be calculated by the following formula $$Corr_{x-u} = \sum_{k=0}^{N-1} \left| \sum_{i=0}^{M-1} x_{-k-i} \cdot u_{-i} \right|$$

where N depends on the expected length of the echo impulse response, and could for instance be equal to the number of coefficients in the FIR filter of the LEC 204. For illustration, N=256 which is believed appropriate for a vehicle hands-free acoustic echo suppressor. Likewise, the correlation of signal x to signal e ($\text{Corr}_{x-e}$) may be calculated by the formula $$\text{Corr}_{x-e} = \sum_{k=0}^{N-1} \left| \sum_{i=0}^{M-1} x_{-k-i} \cdot e_{-i} \right|$$

Thereafter, the gain of echo energy through the LEC 204 and summer 202 collectively, referred to as Echo Gain may be estimated by simply dividing $\text{Corr}_{x-e}$ by $\text{Corr}_{x-u}$. Because the Echo Gain should not be more than one, a bounding criteria may be applied by employing a min function when estimating Echo Gain along the lines of the following:

$$\text{Echo Gain} = \min\left(1, \frac{\text{Corr}_{x-e}}{\text{Corr}_{x-u}}\right)$$

The control logic 206 also estimates the energy of signal y ($\text{Energy}_y$). Armed with Echo Gain and $\text{Energy}_y$, the residual echo component ($\text{Energy}_{recho}$) may be estimated as $$\text{Energy}_{recho} = \text{Energy}_y \cdot (\text{Echo Gain})^2$$

In addition to $\text{Energy}_{recho}$, the control logic 206 preferably looks at the energy of the non-echo components of signal e, referred to as $\text{Energy}_{non-echo}$. Ideally, $\text{Energy}_{non-echo}$ should be simply $\text{Energy}_e$ minus $\text{Energy}_{recho}$. Of course, from a performance point of view, it is probably better to estimate $\text{Energy}_{non-echo}$ too low than too high, so a conservative value of $\text{Energy}_{non-echo}$ should be used. As a bounding consideration, however, it should be noted that the non-echo energy cannot be lower than the energy of the background noise, $\text{Noise}_{back}$. $\text{Noise}_{back}$ may be estimated in any conventional fashion. For instance, the noise in signals u, y, and e, referred to as $\text{Noise}_u$, $\text{Noise}_y$ and $\text{Noise}_e$, may be calculated, such as by the methods described in U.S. application Ser. No. 09/005,145. $\text{Noise}_{back}$ may then be estimated as the max of zero and ($\text{Noise}_u$ minus $\text{Noise}_y$), but not more than either $\text{Noise}_e$ and $\text{Energy}_e$. Armed with $\text{Noise}_{back}$, $\text{Energy}_{non-echo}$ may be determined by the following:

$$\text{Energy}_{non-echo} = \max(\text{Energy}_e - \text{Energy}_{recho}, \text{Noise}_{back})$$

The gain of the residual echo suppressor 208, $\text{Gain}_{res}$, may then be set so that the residual echo-component is perceptually masked by the non-echo components. One approach to calculating $\text{Gain}_{res}$ is to use the formula $$\text{Gain}_{res} = \sqrt{\frac{\text{Energy}_{non-echo}}{\text{Energy}_{recho} \cdot P_2}}$$

where $P_2$ represents a predetermined psychoacoustic factor. One suitable value for $P_2$, from empirical evidence, is 2048, representing a 33 dB non-echo to residual echo ratio. It should be noted that this value of $P_2$ assumes that comfort noise will be subsequently added, as described above; if comfort noise is not to be added, other functions of $\text{Energy}_{recho}$ may be used to set $\text{Gain}_{res}$ such that the residual echo is suitably attenuated. The echo canceled signal e is then subjected to $\text{Gain}_{res}$ at residual echo suppressor 208 to produce echo suppressed signal s, which is then augmented by comfort noise as appropriate.

It should be noted that in some situations, the residual echo present in signal e is already so low as to be perceptually masked. In such a situation, it may be said that $$\frac{\text{Energy}_{non-echo}}{\text{Energy}_{recho}} \geq P_1,$$

where $P_1$ is another psychoacoustic factor representing the perceptual masking threshold. One empirically determined masking threshold is 18 dB, or a factor of 64 for the energy ratio. If the ratio above indicates that the residual echo is already sufficiently masked, the $\text{Gain}_{res}$ may be conceptually set to one (no attenuation) by either setting the gain for residual echo suppressor 208 to one or by simply bypassing the residual echo suppressor 208. Note that when $\text{Gain}_{res}$ is set to one, no comfort noise need be added to the signal. Alternatively, when the residual echo is already sufficiently masked, $\text{Gain}_{res}$ may be set to some other value that applies minimal attenuation to e but that helps ensure loop stability.

The process outlined above used a correlation-based approach to estimating $\text{Energy}_{recho}$. However, other approaches may also be used. For instance, the energies related to the operation of the LEC 204 may be used to estimate $\text{Energy}_{recho}$. When the LEC 204 is perfectly trained, $\text{Energy}_{non-echo}$ should equal $\text{Energy}_u$ minus $\text{Energy}_y$, assuming that the echo and non-echo components are un-correlated. However, a more conservative estimate of $\text{Energy}_{non-echo}$, labeled $\text{Energy}'_{non-echo}$, would take into account a safety factor f, of say 1.125 to 1.5, and should optionally take into consideration that the value cannot go below zero so that $\text{Energy}'_{non-echo} = \max(0, \text{Energy}_u - f \cdot \text{Energy}_y)$. With $\text{Energy}_e$ being simply $\text{Energy}_{recho}$ plus $\text{Energy}'_{non-echo}$, $\text{Energy}_{recho}$ may be estimated as $\text{Energy}_{recho} = \text{Energy}_e - \max(0, \text{Energy}_u - f \cdot \text{Energy}_y)$. Other approaches to estimating $\text{Energy}_{recho}$ may also be used. When more than one approach is used, then it may be prudent to select the higher of the various estimates as the value of $\text{Energy}_{recho}$ to be used. However, it may also be useful to note that the residual echo energy cannot exceed the total energy of signal e, so $\text{Energy}_e$ sets an upper limit on $\text{Energy}_{recho}$.

In the discussion above, $\text{Gain}_{res}$ has been treated as a single control value. However, $\text{Gain}_{res}$ may instead take the form of a plurality of control values. For instance, the control logic 206 may supply residual echo suppressor 208 with two gain values, as may be needed if residual echo suppressor 208 includes an AC-center attenuator; one value for the main gain, and another value for the window gain. As such, the exemplary calculation for $\text{Gain}_{res}$ discussed above is only one of many examples of how the control signal may be based on $\text{Energy}_{recho}$ within the scope of the present invention. For instance, if residual echo suppressor 208 includes an AC-center attenuator, as described in U.S. application Ser. No. 09/005,149 (incorporated herein by reference), the control signal from control logic 206 to residual echo suppressor 208 should include a window gain ($\text{Gain}_{window}$), which may be calculated as $$\text{Gain}_{window} = \text{CrestFactor} \cdot \text{ChannelGain} \cdot \sqrt{\frac{\text{Energy}_{recho}}{\text{Energy}_y}}$$

Or, $\text{Gain}_{window}$ may be based less directly on $\text{Energy}_{recho}$, such as through the value of Echo Gain previously discussed such that $$\text{Gainwindow} = \text{CrestFactor} \cdot \text{ChannelGain} \cdot \text{Echo Gain}$$

and the like. Of course, other relevant gain parameters may also be determined based on $\text{Energy}_{recho}$ and included in the control signal from control logic 206 to residual echo suppressor 208. Thus, it is intended that both a single control value and multiple control values are considered to be within the meaning of "a control signal."

Figure 4:
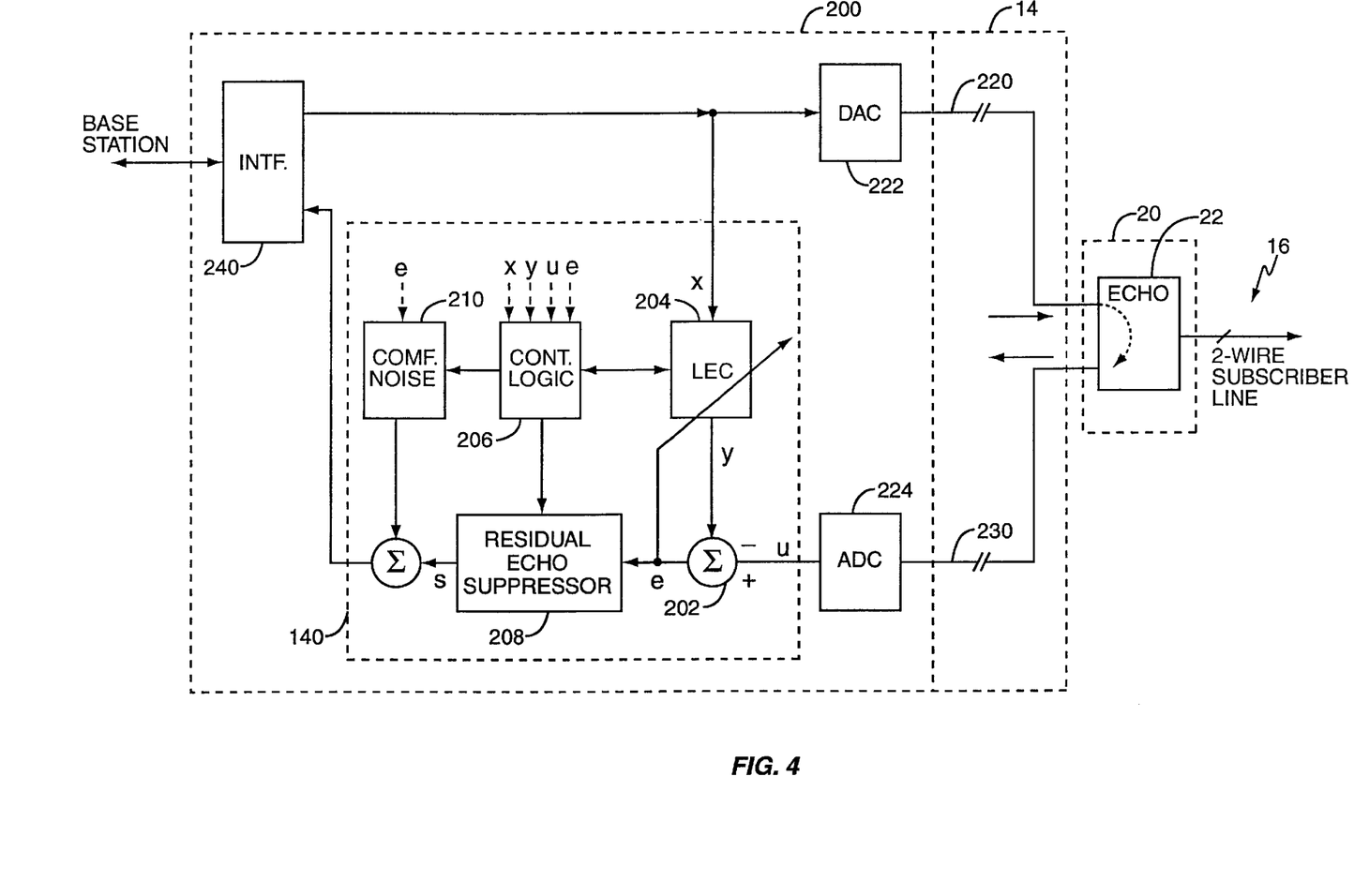
FIG. 4 shows an alternate, exemplary embodiment of a portion of a communications network incorporating the echo suppressor of the present invention.

The discussion above has focused on acoustic echo which, as earlier noted, represents one of two primary causes of voice echo in the communications system 10. However, the echo suppression approach outlined above may also serve to suppress the second primary cause of voice echo, namely, network echo. For this function, the mobile terminal 100, a base station, the MSC 200, or the transmission network 14 may include the echo suppresser 140 of the present invention. FIG. 4 provides an exemplary illustration of an embodiment where the MSC 200 includes the echo suppresser 140.

The MSC 200 includes an interface 240 for transferring signals to and from base station 24. Signals representative of the mobile terminal user's speech are transmitted by the MSC 200 through the transmission network 14 to the Central Office 20 on a transmit wire pair 220—these signals are termed the transmitted speech signal. Likewise, signal representative of the telephone handset user's speech are received by the MSC 200 from Central Office 20 through transmission network 14 on a receive wire pair 230—these signals are termed received speech signals. While the wire pairs 220,230 are shown as wire pairs in FIG. 1, the wire pairs need not be actual physical wire pairs; for instance, the wire pairs 220,230 may be digital trunk lines with separate transmit and receive paths. The Central Office 20 uses hybrid circuit 22 to combine transmitted and received speech signals from transmit and receive wire pairs 220 and 230, for transfer on the two-wire subscriber loop 16. Due to impedance mismatches between the hybrid circuit 22 and subscriber loop 16, a portion of the transmitted signals carried on wire pair 220 couple into the received signals carried by wire pair 230. Absent adequate network echo control, the mobile terminal user hears a delayed version of their own speech signal output from the loudspeaker 168 of mobile terminal 100.

In the context of FIG. 4, the outgoing transmitted speech signals from mobile terminal 100 are considered the echo-causing signal x, while the incoming received speech signals from the telephone handset 18 are considered the echo-containing signal u. Note that, in an exemplary embodiment, the echo suppresser 140 of the present invention operates on signal x before conversion to analog format by DAC 222 and operates on signal u after conversion to digital format by ADC 224. With these references established, operation of the present invention in the context of network echo suppression may be readily understood on the basis of the discussion related to FIGS. 2–3.

As pointed out above, the suppression of network echo may optionally be carried out in the mobile terminal 100, substantially as described in relation to acoustic echo. However, for purposes of network echo suppression in the mobile terminal 100, the desired-voice is the voice from the end remote from the mobile terminal 100 while the echo-causing voice is the voice of the mobile unit's user. Thus, when suppressing network echo in the mobile terminal 100, it may be prudent to locate the echo suppressor 140 in the receiver DSP 154 for suppressing echo in the receive signal and to provide a suitable tap off the transmit signal path for the echo-causing signal, such as between comfort noise unit 210 and additional processing 212, or at some intermediate stage of additional processing 212. It is believed that locating a network echo suppressor in the mobile terminal 100 is particularly suited to analog wireless communications, such as the Advanced Mobile Phone System (AMPS) common in the United States.

As noted earlier, the discussion above assumes that control logic 206 focuses on residual echo rather than just residual voice echo. However, the control logic 206 may alternatively base its decisions, and generate the control signal, based on the residual voice echo, either ignoring the residual echo noise or treating the residual noise echo as background noise. If this approach is taken, then the formulas above should be adjusted, such as by substituting $\text{Energy}_{y\text{-}voice}$ (the energy of the voice component of signal y) for $\text{Energy}_y$ and substituting $\text{Energy}_{recho\text{-}voice}$ (energy of the residual voice echo component of signal e) for $\text{Energy}_{recho}$. Under such a fine-tuned approach, the gain of the residual echo suppressor 208 is controlled based on the energy of a subset of the residual echo, rather than on the energy of entire residual echo.

In the discussion above, the LEC 204 has been assumed to be a linear echo canceler; however, this is not required. Instead, the echo canceler portion represented by LEC 204 may be any form of echo canceler and need not be linear. Further It should be noted that echo suppressor 140, including LEC 204 and residual echo suppressor 210 and control logic 206, may operate in whole or in part in the time domain or the frequency domain as appropriate or desired.

Additionally, the discussion above has used the term "energy" in a number of places, such as $\text{Energy}_{non\text{-}echo}$, $\text{Energy}_y$, $\text{Energy}_e$, $\text{Energy}_{recho}$, and so forth. While these values may be energy values in the traditional sense, the values may also be energy proxies, such as root-mean-square values, sum of the absolute values, peak values, or the like. As used herein, the term "energy" is intended to include both the traditional meaning of "energy" and all of these proxies.

In general, the approach outlined above operates on a per frame basis, with perhaps some memory from nearby frames to account for the echo impulse response. Because the gain of a residual echo suppressor is based on the residual echo after initial echo cancellation, rather than the presence/absence of-desired voice, the present approach may be used during both single-talk and double-talk, thereby obviating the need for a complex method of differentiating between single-talk and double-talk situations in order to properly control echo. Thus, a desired voice detector is not required when using the present invention. Note, however, that it may still be desirable to include an echo-causing voice detector monitoring signal x.

The present invention may, in some circumstances, be advantageously combined with the teachings of U.S. patent application Ser. Nos. 09/005,144; 09/005,145; and 09/005,149; which are all incorporated herein by reference.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of controlling an echo suppressor having an echo canceler upstream from a residual echo suppressor having variable gain, comprising:

measuring at least a portion of a residual echo present in the output of said echo canceler, said portion including at least a residual voice echo component;

controlling the gain of said residual echo suppressor based on said measurement of said portion of said residual echo.

2. The method of claim 1 further comprising measuring the residual non-echo present in said output of said echo canceler, and wherein controlling the gain of said residual echo suppressor comprises controlling the gain of said residual echo suppressor based on both said measurement of said portion of said residual echo and measurement of said residual non-echo.

3. The method claim 2 wherein controlling the gain of said residual echo suppressor comprises controlling the gain of said residual echo suppressor based on the estimated energies of said measured portion of said residual echo and said measured residual non-echo.

4. The method claim 1 wherein controlling the gain of said residual echo suppressor comprises controlling the gain of said residual echo suppressor based on the estimated energy of said measured portion of said residual echo.

5. The method of claim 1 wherein said residual echo includes a residual voice echo component and a residual noise echo component, and wherein measuring at least a portion of said residual voice echo present in the output of said echo canceler comprises measuring the combination of said residual voice echo and said residual noise echo components present in the output of said echo canceler; and controlling the gain of said residual echo suppressor comprises controlling the gain of said residual echo suppressor based on said measured residual echo.

6. The method of claim 5 further including estimating said energy of said residual echo using a correlation technique.

7. The method of claim 6 further including:

receiving an echo-causing signal and an echo-containing signal;

generating a signal x based on said echo-causing signal and generating an input signal u based on said echo-containing signal;

generating an estimated echo signal y based on said echo-causing signal;

canceling, based on said estimated echo signal y, an echo component in said input signal u to produce an echo-canceled signal e including said residual echo;

determining the energy of said estimated echo signal y;

wherein estimating said energy of said residual echo using a correlation technique comprises estimating said energy of said residual echo via correlation between said signal x and said signal u and correlation between said signal x and said echo-canceled signal e and based on said energy of said estimated echo signal y.

8. The method of claim 7 wherein said echo-canceled signal e includes non-echo components, and further comprising estimating the energy of said non-echo components of said echo-canceled signal e, and wherein controlling the gain of said residual echo suppressor based on said measured residual echo comprises determining said gain according to the formula $$Gain_{res} = \sqrt{\frac{Energy_{non\text{-}echo}}{Energy_{recho} \cdot P_2}}$$

where $Gain_{res}$ is said gain, $Energy_{non\text{-}echo}$ is said energy of said non-echo components, $Energy_{recho}$ is said energy of said residual echo component, and $P_2$ is a predetermined psychoacoustic factor.

9. The method of claim 8 wherein $P_2$ is at least about 1024.

10. The method of claim 8 wherein $P_2$ is about 2050.

11. The method of claim 5 further including:

receiving an echo-causing signal and an echo-containing signal;

generating an input signal u based on said echo-containing signal;

generating an estimated echo signal y based on said echo-causing signal;

canceling, based on said estimated echo signal y, an echo component in said input signal u to produce an echo-canceled signal e including said residual echo;

determining the energy of said input signal u; determining the energy of said estimated echo signal y; determining the energy of said echo-canceled signal e;

estimating said energy of said residual echo based on said energies of said signals u, y, and e.

12. The method of claim 11 wherein estimating said energy of said residual echo based on said energies of said signals u, y, and e comprises estimating said energy of said residual echo by subtracting the energy of signal u from the energy of signal e and adding a real-number multiple of said energy of said signal y.

13. The method of claim 12 wherein said real-number multiple is selected from the group consisting of 1, 1.125, 1.25, and 1.5.

14. The method of claim 11 wherein estimating said energy of said residual echo based on said energies of said signals u, y, and e comprises estimating said energy of said residual echo ($Energy_{recho}$) according to the formula $$Energy_{recho} = Energy_e - \max(0, Energy_u - f \cdot Energy_y)$$

where $Energy_{recho}$ is said energy of said residual echo component, $Energy_e$ is said energy of said signal e, $Energy_u$ is said energy of said signal u, $Energy_y$ is said energy of said signal y, and f is a safety factor.

15. The method of claim 14 wherein said safety factor is selected from the group consisting of 1, 1.125, 1.25, and 1.5.

16. The method of claim 5 further including:

receiving an echo-causing signal and an echo-containing signal;

generating a signal x based on said echo-causing signal and generating an input signal u based on said echo-containing signal;

generating an estimated echo signal y based on said echo-causing signal;

canceling, based on said estimated echo signal y, an echo component in said input signal u to produce an echo-canceled signal e including said residual echo;

determining the energy of said echo-canceled signal e; determining the energy of said input signal u; determining the energy of said estimated echo signal y;

generating a first estimate of said energy of said residual echo by subtracting the energy of signal u from the energy of signal e and adding a real-number multiple of said energy of said signal y;

generating a second estimate of said energy of said residual echo via a correlation between said signal x and said signal u and correlation between said signal x and said echo-canceled signal e and based on said energy of said estimated echo signal y;

wherein controlling the gain of said residual echo suppressor based on the estimated energy of said residual echo comprises controlling the gain of said residual echo suppressor based on the larger of said first estimate and said second estimate.

17. The method of claim 1 wherein controlling the gain of said residual echo suppressor comprises controlling the gain of said residual echo suppressor based on said measured residual voice echo to produce an echo suppressed signal, and further comprising adding comfort noise to said echo suppressed signal to produce an augmented signal.

18. The method of claim 17 wherein adding comfort noise to said echo suppressed signal comprises adding comfort noise to said echo suppressed signal in an amount that varies based on said gain.

19. The method of claim 17 wherein said echo suppressed signal includes echo and non-echo components, and wherein said non-echo components and said comfort noise jointly act to perceptually mask said echo in said augmented signal.

20. A method of reducing perceived echo during bi-directional communications, comprising:
at least partially echo canceling an input audio signal to create an echo-canceled signal, said echo canceled signal having a residual echo component and a non-echo component;
estimating the energy of said residual echo component;
processing said echo-canceled signal with a residual echo suppressor having an adjustable gain to produce an echo suppressed signal;
controlling said gain of said residual echo suppressor based on said estimated energy of said residual echo component of said echo cancelled signal.

21. The method of claim 20 further comprising adding comfort noise to said echo suppressed signal to produce an augmented signal, wherein the amount of comfort noise added varies depending on said gain of said residual echo suppressor.

22. The method of claim 20 wherein controlling said gain of said residual echo suppressor based on the energy of said residual echo component of said echo cancelled signal comprises controlling said gain of said residual echo suppressor according to the formula $$Gain = \sqrt{\frac{Energy_{non-echo}}{Energy_{EDR} \times P_2}}$$

if $Energy_{non-echo}$ is not more than $P_1$ times $Energy_{recho}$ where $Energy_{recho}$ is the energy of said residual echo component, $Energy_{non-echo}$ is the energy of said non-echo component, $P_1$ is a first predetermined psychoacoustic factor, and $P_2$ is a second predetermined psychoacoustic factor.

23. The method of claim 22 wherein $P_1$ is at least 32 and $P_2$ is at least 1024.

24. The method of claim 23 wherein $P_1$ is at least 64 and $P_2$ is at least 2048.

25. A method of reducing perceived echo during bi-directional communications, comprising:
at least partially echo canceling an echo-containing signal to create an echo-canceled signal, said echo canceled signal having a residual echo component and a non-echo component;
estimating the energy of said residual echo component;
processing said echo-canceled signal via a first circuit path or a second circuit path to produce an echo suppressed signal depending on whether said energy of said residual echo component exceeds a predetermined ratio with respect to an estimated energy of said non-echo component;
wherein said first circuit path includes a residual echo suppressor having an adjustable gain, wherein said gain of said residual echo suppressor is controlled based on said estimated energy of said residual echo component of said echo cancelled signal;
wherein said second circuit path bypasses said residual echo suppressor;
selecting said second circuit path when said energy of said residual echo component is not more than said predetermined ratio with respect to said estimated energy of said non-echo component.

26. The method of claim 25 wherein said ratio is approximately 1/64 or less.

27. A communications device, comprising
an echo suppressor having at least an echo canceler portion upstream from a residual echo suppressor portion, said echo suppressor further having a control logic circuit;
said echo canceler receiving an echo-causing signal and an echo-containing signal and producing an echo-canceled signal based thereon, said echo-canceled signal comprising at least a residual echo component and a non-echo component, said residual echo component including at least a residual voice echo component;
said a residual echo suppressor having a variable gain responsive to a control signal and producing an echo-suppressed signal based on said echo-canceled signal and said gain;
said control logic circuit generating said gain signal based on the energy of at least a portion of said residual echo of said echo-canceled signal, said portion including at least said residual voice echo component.

28. The communications device of claim 27 further including a comfort noise source producing comfort noise, wherein some amount of said comfort noise and said echo-suppressed signal are combined to produce an augmented signal.

29. The communications device of claim 28 wherein said amount of said comfort noise varies based on said variable gain of said residual echo suppressor.

30. The communications device of claim 27 further including a first estimate of said energy of said residual echo generated by said control logic circuit via a first technique and a second estimate of said energy of said residual echo generated by said control logic circuit via a second technique.

31. The communications device of claim 30 wherein at least one of said first technique and said second technique is a correlation technique.

32. The communications device of claim 27 wherein said communications device is a wireless communications mobile terminal.

33. The communications device of claim 27 wherein said residual echo suppressor comprises a non-linear processor selected from the group consisting of a center attenuator, an AC-center attenuator, a center clipper, and an AC-center clipper.

34. A wireless communications mobile terminal, comprising
a receiver generating an audio output signal based on processing a received signal;
an input transducer producing an audio input signal based on receiving input sounds;
an echo-canceler producing an echo-canceled signal based on said audio input signal by reducing an echo component forming a portion of said audio input signal, said echo component associated with said audio output signal, said echo-canceled signal including residual echo and non-echo components;

a residual echo suppressor having a variable gain disposed downstream from said echo-canceler and producing an echo-suppressed signal based on said echo-canceled signal;

a control signal controlling said variable gain of said residual echo suppressor based on the energy of said residual echo of said echo-canceled signal;

an antenna transmitting a transmit signal derived from said echo-suppressed signal.

35. The mobile terminal of claim 34 further including a comfort noise source producing comfort noise at a level that varies based on said variable gain of said residual echo suppressor, wherein said transmit signal is derived from said echo-suppressed signal and said comfort noise.

36. The mobile terminal of claim 34 further comprising control logic generating said control signal, said control logic adapted to estimate said energy of said residual echo in said echo-canceled signal and generate said control signal based thereon.

37. The mobile terminal of claim 36 wherein said control logic is adapted to estimate said energy of said residual echo based on both a first estimate of said residual echo energy determined via a first technique and a second estimate of said residual echo energy determined via a second technique.

38. The method of claim 1 wherein said echo canceler produces an output having at least a desired voice conceptual component, a background noise conceptual component, and said residual echo as a component.

* * * * *